United States Patent [19]

Comstock et al.

[11] 4,288,571
[45] * Sep. 8, 1981

[54] POLYESTER COMPOSITIONS

[75] Inventors: Lowell R. Comstock, South Charleston; Percy L. Smith, Dunbar, both of W. Va.

[73] Assignee: Union Carbide Corporation, New York, N.Y.

[ * ] Notice: The portion of the term of this patent subsequent to Feb. 27, 1990, has been disclaimed.

[21] Appl. No.: 336,120

[22] Filed: Feb. 26, 1973

Related U.S. Application Data

[63] Continuation-in-part of Ser. No. 107,514, Jan. 18, 1971, abandoned, which is a continuation-in-part of Ser. No. 8,070, Feb. 2, 1970, abandoned, which is a continuation-in-part of Ser. No. 72,798, Sep. 16, 1970, Pat. No. 3,718,714.

[51] Int. Cl.³ ............................................. C08L 67/06
[52] U.S. Cl. .................................. 525/170; 260/40 R; 525/169
[58] Field of Search ............ 260/862, 40 R; 525/170, 525/169

[56] References Cited

U.S. PATENT DOCUMENTS

| | | | |
|---|---|---|---|
| 2,627,482 | 2/1953 | Martin et al. | 117/126 |
| 3,700,624 | 10/1972 | Adachi et al. | 260/31.6 |
| 3,701,748 | 10/1972 | Kroekel | 260/40 |
| 3,718,714 | 2/1973 | Comstock | 260/862 |
| 3,721,642 | 3/1973 | Schalin et al. | 260/40 R |

FOREIGN PATENT DOCUMENTS

| | | | |
|---|---|---|---|
| 887693 | 12/1971 | Canada | 260/862 |
| 42-9269 | 7/1967 | Japan . | |

*Primary Examiner*—Earl A. Nielsen
*Attorney, Agent, or Firm*—George A. Skoler; James C. Arvantes

[57] ABSTRACT

The disclosure of this application is directed to unsaturated polyester compositions, containing as a low-profile additive a carboxyl containing thermoplastic polymer of a vinyl ester of an aliphatic, saturated monocarboxylic acid, which have particular utility in molding applications to form aesthetically attractive thermoset articles characterized by excellent physical properties, as for example, impact strength and by excellent surface properties such as excellent smoothness and gloss, excellent receptiveness to paints and excellent reproduction of the surface contours of the mold in which they are formed into shaped, thermoset articles.

31 Claims, No Drawings

POLYESTER COMPOSITIONS

This application is a continuation-in-part of our co-pending application Ser. No. 107,514 filed Jan. 18, 1971, now abandoned which in turn is a continuation-in-part of application Ser. No. 8,070 filed Feb. 2, 1970, now abandoned and application Ser. No. 72,798 filed Sept. 16, 1970, now U.S. Pat. No. 3,718,714.

This invention relates to unsaturated polyester compositions containing, as a low-profile additive, a carboxyl containing thermoplastic polymer of a vinyl ester of an aliphatic, saturated monocarboxylic acid. More specifically, this invention relates to unsaturated polyester composition, as described, which have particular utility in molding applications to form aesthetically attractive thermoset articles, as for example, fenders, dash-boards and other like component parts of automobiles, characterized by excellent physical properties such as impact strength and by excellent surface properties including excellent smoothness and gloss, excellent receptiveness to paints and excellent reproduction of the surface contours of the mold in which they are formed into shaped, thermoset articles.

Compositions, based on unsaturated polyesters, are finding increased use in the automotive industry as compositions from which can be molded fenders, dashboards and other like component parts of automobiles. As a general rule, these compositions contain, in addition to the unsaturated polyesters, so-called low-profile additives such as poly(methyl methacrylate), poly(vinyl chloride) and polyethylene. A low-profile additive is a material designed to insure that there is no undesirable shrinkage by the composition, to which the additive has been added, as the composition is being molded into a thermoset article. In other words, low-profile additives have been added to unsaturated polyester composition for the purpose of obtaining composition which can be molded into thermoset articles, the surfaces of which truly reflect the surface characteristics of the mold.

Although the use of low-profile additives, as described, does effect some degree of improvement in the antishrinkage characterisitcs of the unsaturated polyester compositions, it has been found that the thermoset articles molded therefrom are characterized either by relatively poor surface properties, as for example, poor smoothness, poor gloss and poor paint receptiveness, or by relatively poor impact properties or by both.

The present invention provides unsaturated polyester compositions which can be molded into thermoset articles which are aesthetically attractive, being characterized by excellent smoothness and gloss and truly reflecting the surface contour of the mold in which they were formed into shaped thermoset articles. Also, these thermoset articles have excellent receptiveness to paints and are further characterized by excellent impact strength.

The compositions of this invention comprise an unsaturated polyester and a carboxyl containing thermoplastic polymer of a vinyl ester of an aliphatic, saturated monocarboxylic acid wherein the vinyl ester is present in an amount of about 1 to about 85 percent by weight, generally about 1 to about 60 percent by weight, and preferably about 3 to about 35 percent by weight based on the weight of the unsaturated polyester. Alternatively, based on the combined weight of the unsaturated polyester and polymerizable, ethylenically unsaturated monomer which serves to cross-link the unsaturated polyester to a thermoset product, as subsequently described, the amount of carboxyl containing thermoplastic polymer of vinyl ester used is about 1 to about 60 percent by weight, generally about 2 to about 25 percent by weight and preferably about 5 to about 15 percent by weight.

The unsaturated polyesters which are admixed with the vinyl ester polymers, as previously described, to provide the compositions of this invention are condensation reaction products of an unsaturated polycarboxylic acid and a polyol and generally have an average molecular weight of about 500 to about 10,000, preferably about 1,000 to about 6,000, which based on an acid number, have an acid number less than about 100, generally below about 75 and preferably about 10 to about 70 and more preferably about 10 to about 60.

Illustrative of suitable unsaturated polycarboxylic acids which are condensed with the polyols to produce the unsaturated polyesters of this invention are those having the formula:

FORMULA I

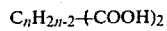

$$C_nH_{2n-2}(COOH)_2$$

wherein n is an integer having a value of 2 to 20 inclusive, preferably 2 to 10 inclusive. Among such acids can be noted fumaric acid, maleic acid, glutaconic acid, citraconic acid, itaconic acid, mesaconic acid, allylmalonic acid, propylidenemalonic acid, hydromuconic acid, pyrocinchonic acid, allyl succinic acid, teraconic acid, xeronic acids, and other like ethylenically unsaturated acids.

Other suitable unsaturated acids include 4-amyl-2,5-heptadienedioic acid, 3-hexynedioic acid, tetrahydrophthalic acid, 3-carboxy cinamic acid and the like.

If desired, the acid anhydrides of the acids previously described can be used per se or in admixture with the acids to produce the unsaturated polyesters of this invention.

In addition to the anhydrides of the acids noted above, the following acid anhydrides can also be used: pentenyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as bicyclo-[2,2,1]-hept-5-ene-2,3-dicarboxylic anhydride and the like.

If desired, aromatic polycarboxylic acids, saturated polycarboxylic acids, anhydrides thereof or monocarboxylic acids can be used, in conjunction with the unsaturated polycarboxylic acids or the anhydrides thereof, to produce the unsaturated polyesters.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of twenty-two carbon atoms, are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticaca oil, perilla oil, olive oil, safflower oil, sardine oil, soybeam oil, tall, oil, tung oil, (China wood oil), and the like.

Illustrative of suitable polyols for purposes of this invention are the dihydric alcohols or diols having the formula

FORMULA II

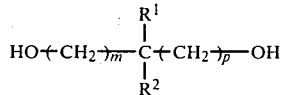

wherein the sum of m+p is at least 1, preferably 1 to 20 inclusive and $R^1$ and $R^2$, which can be the same or different, are hydrogen or alkyl and when alkyl, containing 1 to 20 carbon atoms, inclusive, preferably 1 to 10 carbon atoms inclusive. Specific compounds include, among others, ethylene glycol, propylene glycol, butanediol-1,2, butane diol-1,3, butanediol-1,4, hexanediol-1,6, decanediol-1,10, neopentyl glycol trimethyl pentane diol and the like.

Also suitable are the ether diols having the formula:

FORMULA III

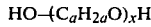

wherein a has a value of at least 1, preferably 2 to 6 inclusive, and x has a value of at least 2, preferably 2 to 10 inclusive. Among compounds falling within the scope of this formula are diethylene glycol, dipropylene glycol, triethylene glycol, tetraethylene glycol, and the like.

Other suitable polyols are the polyhydric compounds such as pentaerythritol, dipentaerythritol, glycerol, diglycerol, pentaglycerol, trimethyolol propane, polyvinyl alcohol and the like.

Preparation of unsaturated polyesters can be carried out by methods well known in the art. As a rule, the condensation reaction is conducted by reacting a mixture containing an unsaturated polycarboxylic acid and a polyol, in an amount of about 2 to about 15 percent in molar excess with respect to the "acidic" reactant at temperatures on the order of about 16−° C. to about 250° C., preferably about 175° C. to about 225° C., to polyesters having an acid number of less than about 100, generally below about 75 and preferably about 10 to about 70.

Illustrative of carboxyl containing thermoplastic polymers of vinyl esters of aliphatic, saturated monocarboxylic acids are the polymers of vinyl esters having the formula:

FORMULA IV

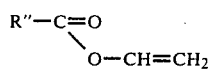

wherein R" is hydrogen or a saturated, aliphatic hydrocarbon radical, generally having a maximum of 20 carbon atoms and preferably having a maximum of 8 carbon atoms such as vinyl formate, vinyl acetate, vinyl chloroacetate, vinyl butyrate, vinyl isobutyrate, vinyl valerate, vinyl pentanoate, vinyl trimethylacetate, vinyl caproate, vinyl laurate, vinyl stearate and the like and a carboxyl containing monomer, as for example, fall within the scope of Formula V and VI below.

FORMULA V—Unsaturated dicarboxylic acids

wherein n is as defined in Formula I.

FORMULA VI—Unsaturated monocarboxylic acids

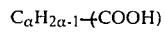

wherein α is an integer having a value of 2 to ten inclusive preferably 2 to 6 inclusive.

Acids falling within the scope of Formula V have been set forth with respect to Formula I.

Acids falling within the scope of Formula VI include among others: acrylic acid, ethacrylic acid, methacrylic acid, crotonic acid, isocrotonic acid, pentenic acid and the like. Halogenated derivatives thereof, such as chloroacrylic acid can also be used.

The thermoplastic vinyl polymers of a vinyl ester of an aliphatic, saturated monocarboxylic acid of this invention contain an average of at least one carboxyl group per molecule, generally an average of one to about 10 and preferably an average of one to about 3 carboxyl groups per molecule. On a weight basis, suitable thermoplastic polymers contain about 0.2 to about 5 percent by weight, preferably about 0.5 to about 2 percent by weight combined "carboxyl" compound. These polymers can be prepared in a number of ways, all well known in the art, by:

(1) polymerizing a vinyl ester, as defined, with a copolymerizable carboxylic acid to produce a copolymer having an average of at least one carboxyl group per molecule.

(2) reacting a poly(vinyl ester) as defined with a copolymerizable carboxylic acid.

(3) partially hydrolyzing a poly(vinyl ester) as described generally to a maximum value of twenty percent based on the total number of ester groups originally present and partially or totally esterifying the hydroxyl groups with a poly carboxylic acid as previously described in this specification or with the anhydrides thereof.

If desired, other polymerizable monomers can be polymerized with the vinyl esters of an aliphatic, saturated monocarboxylic acid and a "carboxyl" monomer to produce carboxyl containing interpolymers provided that (1) the carboxyl content and carboxyl monomer content of the resultant polymers is as previously defined and the weight of the combined vinyl ester of an aliphatic, saturated monocarboxylic acid is at least about 5 percent by weight, generally at least about 10 percent by weight and preferably at least about 40 percent by weight.

Illustrative of suitable polymerizable monomers are the following:

Polymerizable, ethylenically unsaturated monomers exemplified by vinyl chloride, vinyl bromide, vinyl fluoride, vinylidene halides, such as vinylidene chloride and vinylidene bromide; methlacrylate, ethyl acrylate, butyl acrylate, n-octyl acrylate, 2-ethyl hexyl acrylate, n-decyl acrylate, glycidyl methacrylate, acrylamide, N-methyl acrylamide, N,N-dimethylacrylamide, methacrylamide, N-methyl methacrylamide, N,N-dimethyl methacrylamide, acrylonitrile, chloroacrylonitrile, methacrylonitrile, ethacrylonitrile; vinyl naphthalene; alkyl esters such as dimethyl maleate, dibutyl maleate; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone; also vinyl pyridine, N-vinyl carbazole, N-vinyl pyrrolidene, ethyl methylene malonate, isobutylene, ethylene, trichloroethylene, propylene, vinyl norbornene and various other ethylenically unsaturated compounds.

It is to be understood that mixture of the vinyl esters and/or ethylenically unsaturated monomers and/or carboxylic acids can be used in preparing the thermoplastic vinyl ester polymers of this invention. Also, mixtures of the resultant polymers can be used as the low-profile additives.

As a general rule, suitable vinyl ester polymers have inherent viscosities (ASTMD-1243-58T) of about 0.12 to about 10, generally about 0.12 to about 1 and in order of increasing preference, vinyl ester polymers having the following inherent viscosities, about 0.12 to about 0.68; about 0.15 to about 0.68; about 0.19 to about 0.52; and about 0.27 to about 0.52.

In formulating the compositions of this invention which are to be used in molding applications such as premix and preform, it is customary to admix, with the unsaturated polyesters and the vinyl ester polymers, the following materials:

1. A polymerizable ethylenically unsaturated monomer which serves to cross-link the unsaturated polyester to a thermoset product.
2. A peroxide which serves to accelerate the cross-linking reaction.
3. Fillers, including fillers which serve as reinforcing agents and/or as pigments.

Illustrative of suitable polymerizable, ethylenically unsaturated monomers are the vinyl monomers having the formula:

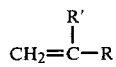

FORMULA V wherein R' is a hydrogen, halogen, or alkyl, i.e., methyl and R is a group having an unsaturated carbon-to-carbon, carbon-to-oxygen, or carbon-to-nitrogen group in conjunction with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, α-methylstyrene, halogenated styrenes such as chlorostyrene, α-chlorostyrene, p-iodostyrene, m-flurostyrene, dichlorostyrene and the like; alkyl substituted styrenes such as p-methylstyrene, p-ethylstyrene, o-tert-butylstyrene and the like; alkoxy and aryloxy substituted styrenes such as p-ethoxystyrene, p-propoxystyrene, p-phenoxystyrene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like;

Wherein R is nitrile; acrylonitrile and the like;

Wherein R is amido; acrylamide, bicycloheptylacrylamide, diacetoneacrylamide and the like;

Wherein R is carboxy; acrylic acid and the like;

Wherein R is carbalkoxy, methyl acrylate, methyl methacrylate, butyl acrylate, octyl acrylate, lauryl acrylate, cyclohexyl acrylate, phenyl acrylate, benzyl acrylate, diallylphthalate and the like.

The amount of ethylenically unsaturated monomer used can vary over wide limits. For example, the monomer can be used in amounts of about 10 to about 60 percent by weight based on the combined weight of the monomer and the unsaturated polyester. It is preferred to use about 20 to about 50 percent by weight ethylenically unsaturated monomer, based on the combined weight of the monomer and the unsaturated polyester.

Among suitable peroxides that can be used are those which function as a free-radical polymerization initiators. Examples of such peroxides are the hydroperoxides such as tertbutyl-hydroperoxide, cumene hydroperoxide, para-menthane-hydroperoxide and the like; peroxy esters such as di-tert-butyl-diperoxyphthalate, tert-butyl peroxyacetate and the like; alkyl peroxides such as 2,5-dimethyl-2,5-bis(t-butylperoxy)hexyne-3 and the like; ketone peroxides such as methyl ethyl ketone peroxide, cyclohexanone peroxide and the like; acyl peroxides such as benqoyl peroxide, para-chlorobenzyl peroxide, 2,4-dichlorobenzoyl peroxide, lauroyl peroxide and the like.

The amount of peroxide used is sufficient to effect a cross-linking or thermosetting of the composition in a relatively short period of time. As a rule, the amount used is about 0.1 to about 5 percent and preferably about 0.5 to about 2 percent by weight based on the weight of the unsaturated polyester.

Fillers, which are commonly employed in polyester compositions include, among others, glass fibers, clay, calcium carbonate, silica, hydrated alumina and the like. These materials are generally used in amounts of about 5 to about 300 and preferably about 20 to about 75 percent by weight based on the weight of the unsaturated polyester.

When it is desired to utilize the compositions of this invention in sheet molding applications, it is customary to add thereto, in addition to additives 1, 2 and 3 above, a thickening agent which serves to provide body to the compositions by increasing the viscosity of the unsaturated polyesters.

Among suitable thickening agents are the oxides and hydroxides of metals of Groups I, II and IV of the Periodic Table (Handbook of Chemistry and Physics—50th Edition). Illustrative of specific oxides and hydroxides of the metals noted are the following: magnesium oxide, calcium oxide, zinc oxide, barium oxide, potassium oxide, magnesium hydroxide, calcium hydroxide, titanium oxide, lead oxide, and the like.

The thickening agents are used in amounts of about 0.5 to about 75 and preferably in amounts of about 1 to about 5 percent by weight based on the weight of the unsaturated polyester.

Also, if desired, other polymers such as poly (←caprolactone) and the like can be added to the compositions of this invention as disclosed in our copending application Ser. No. 107,514 the disclosure of which is incorporated herein by reference.

The compositions of this invention can be prepared by mixing the components in a suitable apparatus such as a Hobart mixer, at temperatures on the order of about 23° C. to about 50° C.

Once formulated, the compositions can be molded into thermoset articles of desired shape, particularly thermoset articles such as automobile fenders, dashboards and the like. The actual molding cycle will, of course, depend upon the exact composition being molded. Suitable molding cycles are conducted at temperatures on the order of about 250° F. to about 350° F. for periods of time ranging from about 0.5 minute to 5 minutes.

The following examples further illustrate the present invention and are not intended to limit the scope thereof in any manner.

1. Surface Smoothness—determined by measuring surface waviness using a microcorder. Reported in micro inches/inch. Lowest readings indicate smoothest surface.

2. Paint Adhesion—determined by painting panels to a thickness of 1 mil, cutting through the paint in both the longitudinal and transverse direction to obtain a cross-hatched surface of one hundred squares with sides of about ¼ inch, applying "Scotch" brand adhesive tape to the entire surface, manually pulling off the tape and visually observing the number of squares pulled off by the tape. Rating was then made according to the following table.

| NO. OF SQUARES REMOVED | RATING - PAINT ADHESION |
|---|---|
| 0–5 | Excellent |
| 6–10 | Very Good |
| 11–20 | Good |
| 21–50 | Poor |
| 51–100 | Very Poor |

EXAMPLE 1

Into a three-necked reaction flask, equipped with a mechanical stirrer, thermometer, gas-inlet tube and steam condenser, there was charged maleic acid anhydride, phthalic acid anhydride and propylene glycol (propanediol-1,2) in a molar ratio of 3 moles of maleic acid anhydride, 1.0 mole of phthalic acid anhydride and 4.4 moles of propylene glycol. The mixture was heated to a temperature of 200° C. and maintained at 200° C. while under a nitrogen gas atmosphere, for 8 hours. At the end of 8 hours, the polyester produced, which had an acid number of 35 was cooled to a temperature of 150° C. and 0.014 percent by weight, based on the weight of polyester, hydroquinone added thereto. Styrene was then admixed with the unsaturated polyester to obtain a solution containing 30 percent by weight styrene.

Using the unsaturated polyester-styrene solution, a "premix" molding composition was prepared containing as the low additive, materials identified in Table 1. In preparing the "premix" composition an initial composition was prepared to which was added fillers to prepare the final "premix" composition. The "initial" composition was prepared by charging the materials noted below to a Hobart mixer and mixing for about 30 minutes.

| "INITIAL" COMPOSITION | GRAMS |
|---|---|
| Unsaturated Polyester Solution of Example 1 | 440 |
| Low-Profile Additive | 96 |
| Styrene | 144 |
| tert-Butylbenzoate | 1.76 |
| 2,5-Diemthyl-2,5-bis-(tert-butylperoxy)hexyne-3 | 1.26 |
| Dimethylphthalate | 0.14 |
| Zinc stearate | 4.0 |
| Black Iron Oxide | 2.0 |
| p-Benzoquinone | 0.044 |

The low-profile additive-styrene noted was added as a mixture; as was the 2,5-dimethyl-2,5-bis(tert-butylperoxy) hexyne-3 and dimethyl-phthalate.

To this initial composition, there was then added: 320 grams of calcium carbonate having an average particle size of about 2 microns, 320 grams of calcium carbonate having an average particle size of about 5–10 microns and 440 grams of an aluminum silicate clay. The resultant mixture was admixed in the Hobart mixer for about 30 minutes and thereafter 300 grams of chopped glass fibers, ¼ of an inch in length, were charged into the Hobart mixer and mixing continued for 3–5 minutes.

The "premix" composition prepared was then used to mold panels, 14 inches by 18 inches by ⅛ of an inch, in a matched metal mold under the following molding cycle:

| Pressure | 500 psig |
|---|---|
| Temperature | 330° F. |
| Time of Molding Cycle | 2–3 minutes |

The panels were then subjected to tests noted in Table 1.

TABLE I

| Premix Compositions | Low-Profile Additive | Inherent Viscosity | Percent by Weight, Based on Unsaturated Polyester | Izod Impact ft. lbs. inch | MCR-Micro Inches/Inch | Paint Adhesion |
|---|---|---|---|---|---|---|
| Example 1* | Polymer of vinyl acetate, vinyl chloride, acrylic acid | 0.31 | 30 | 6.6 | 350 | Excellent |
| Example 2 | Polymer of vinyl acetate, vinyl chloride, maleic acid | 0.48 | 30 | 6.6 | 300 | ↓ |
| Example 3 | Polymer of vinyl acetate, vinyl chloride, maleic acid | 0.40 | 30 | 6.7 | 350 | ↓ |
| Example 4 | Polymer of vinyl acetate-acrylic acid | 0.38 | 30 | 7.0 | 180 | ↓ |
| Example 5 | Polymer of vinyl acetate-methacrylic acid | 0.38 | 30 | 7.0 | 180 | ↓ |
| Control 9 | None | — | 0 | 6.8 | 2000 | ↓ |

*This composition contained 6.6 grams of magnesium hydroxide

The polymers of Examples 1, 2 and 3 are further described as follows:

|  | Percent by weight combined monomers |
| --- | --- |
| Example 1 | |
| vinyl acetate | 42 |
| vinyl chloride | 57 |
| acrylic acid | 1 |
| Examole 2 | |
| vinyl acetate | 13 |
| vinyl chloride | 86 |
| maleic acid | 1 |
| Example 3 | |
| vinyl acetate | 16 |
| vinyl chloride | 83 |
| maleic acid | 1 |
| Example 4 | |
| vinyl acetate | 99.2 |
| acrylic acid | 0.8 |
| Example 5 | |
| vinyl acetate | 99.2 |
| methacrylic acid | 0.8 |

What is claimed is:

1. A composition, suitable for use in molding, comprising an ethylenically unsaturated monomer, an unsaturated polyester which is the condensation product of an ethylenically unsaturated polycarboxylic acid or anhydride and a polyol, and, as a low profile additive, in an amount of from about 1 to about 85 weight percent, based on weight of said unsaturated polyester, a carboxyl containing polymer of a vinyl ester of an aliphatic, saturated monocarboxylic acid, wherein said carboxyl containing polymer contains from about 0.2 to about 5 weight percent of a polymerized carboxyl containing comonomer, and at least about 5 weight percent of polymerized vinyl alkanoate.

2. A composition as defined in claim 1 wherein the vinyl ester polymer is present in an amount of about 1 to about 60 percent by weight based on the weight of the unsaturated polyester.

3. A composition as defined in claim 1 wherein the carboxyl containing polymer is a polymer of a vinyl ester of an aliphatic, saturated monocarboxylic acid and an ethylenically unsaturated carboxylic acid.

4. A composition as defined in claim 1 wherein the vinyl ester of an aliphatic, saturated monocarboxylic acid has the formula:

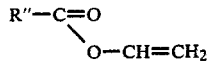

wherein R" is hydrogen or a saturated, aliphatic hydrocarbon radical having a maximum of 20 carbon atoms.

5. A composition as defined in claim 1 wherein R" is a saturated, aliphatic hydrocarbon radical having a maximum of 8 carbon atoms.

6. A composition as defined in claim 1 wherein the said vinyl ester is vinyl acetate.

7. A composition as defined in claim 1 wherein the unsaturated polyester is a condensation reaction product of a mixture containing a polyol and an acid having the formula:

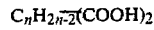

wherein n is an integer having a value of 2 to 20 inclusive.

8. A composition as defined in claim 1 wherein the polyol has the formula:

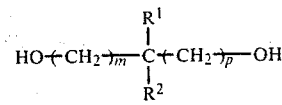

wherein the sum of m+p is 1 to 20 inclusive, $R^1$ and $R^2$ are hydrogen or alkyl.

9. A composition as defined in claim 1 wherein the polyol has the formula:

wherein a has a maximum value of 6, x has a value of 2 to 10 inclusive.

10. A composition as defined in claim 1 wherein the polyol is propylene glycol and the acid anhydride is maleic acid anhydride.

11. A compositon as defined in claim 1 wherein the monomer is styrene.

12. A composition as defined in claim 1 containing a peroxide.

13. The cured product of the composition defined in claim 12.

14. A composition as defined in claim 1 wherein the unsaturated polyester is the condensation reaction product of a mixture containing polyol, an unsaturated polycarboxylic acid or anhydride thereof and an aromatic acid or anhydride thereof.

15. A composition as defined in claim 14 wherein the aromatic acid is phthalic acid.

16. A composition as defined in claim 14 wherein the aromatic acid anhydride is phthalic acid anhydride.

17. A composition as defined in claim 1 containing a polymerizable ethylenically unsaturated monomer in an amount of about 10 to about 60 percent by weight based on the combined weight of said monomer and said polyester and a Group I, II or IV metal oxide or hydroxide thickener in an amount of about 0.5 to about 75 percent by weight based on the weight of said polyester.

18. A composition as defined in claim 1 containing a polymerizable ethylenically unsaturated monomer in an amount of about 10 to about 60 percent by weight based on the combined weight of said monomer and said polyester, a Group I, II or IV metal oxide or hydroxide in an amount of about 0.5 to about 75 percent by weight based on the weight of said polyester and wherein the carboxyl containing vinyl polymer is a polymer of vinyl acetate having an average of at least one carboxyl group per molecule and is present in an amount of about 1 to about 60 percent by weight based on the weight of the said polyester.

19. A composition as defined in claim 17 wherein the thickener is a Group II metal oxide.

20. A composition as defined in claim 17 wherein the thickener is a Group II metal hydroxide.

21. A composition as defined in claim 17 wherein the thickener is a Group IV metal oxide.

22. A composition as defined in claim 17 wherein the thickener is a Group IV metal hydroxide.

23. A composition as defined in claim 17 wherein the thickener is calcium hydroxide.

24. A composition as defined in claim 17 wherein the polyol is ethylene glycol and the acid is fumaric acid.

25. A composition as defined in claim 17 wherein the polyol is propylene glycol and the acid anhydride is maleic acid anhydride.

26. A composition as defined in claim 17 wherein the ethylenically unsaturated monomer is a vinyl monomer.

27. A composition as defined in claim 26 wherein the vinyl monomer is styrene.

28. The thermoset product of the composition defined in claim 26.

29. A composition as defined in claim 17 wherein the thickener is a Group I metal oxide.

30. A composition as defined in claim 17 wherein the thickener is a Group I metal hydroxide.

31. A composition comprising (A) an unsaturated polyester which is the condensation product of at least one ethylenically unsaturated dicarboxylic acid with at least one dihydric alcohol, (B) an ethylenically unsaturated monomer, and (C) 1 to 60 percent by weight, based on the combined weight of the unsaturated polyester and the ethylenically unsaturated monomer, of a polymer containing, in combined form, vinyl acetate and about 0.2 to about 5 percent by weight of ethylenically unsaturated carboxylic acid.

* * * * *